(12) United States Patent
Hirano et al.

(10) Patent No.: US 7,798,206 B2
(45) Date of Patent: Sep. 21, 2010

(54) HEAT EXCHANGER AND METHOD OF MANUFACTURING THE SAME

(75) Inventors: Hirosaburo Hirano, Oyama (JP); Hiroyuki Sudo, Oyama (JP); Takashi Hirayama, Oyama (JP)

(73) Assignee: Showa Denko K.K., Tokyo (JP)

( * ) Notice: Subject to any disclaimer, the term of this patent is extended or adjusted under 35 U.S.C. 154(b) by 903 days.

(21) Appl. No.: 11/670,146

(22) Filed: Feb. 1, 2007

(65) Prior Publication Data

US 2007/0181291 A1 Aug. 9, 2007

(30) Foreign Application Priority Data

Feb. 7, 2006 (JP) .............................. 2006-029305

(51) Int. Cl.
*F28F 9/02* (2006.01)
(52) U.S. Cl. ........................ 165/173; 165/149; 165/176; 29/890.052
(58) Field of Classification Search ................. 165/148, 165/149, 173, 174, 175, 176; 29/890.052; 228/183
See application file for complete search history.

(56) References Cited

U.S. PATENT DOCUMENTS

| | | | | |
|---|---|---|---|---|
| 5,195,579 A | * | 3/1993 | Buchanan | 165/149 |
| 5,311,933 A | * | 5/1994 | Lee | 165/149 |
| 5,678,628 A | * | 10/1997 | Aki et al. | 165/173 |
| 5,944,095 A | * | 8/1999 | Fukuoka et al. | 165/173 |
| 6,250,381 B1 | * | 6/2001 | Nishishita | 165/175 |
| 6,675,883 B1 | * | 1/2004 | De Keuster et al. | 165/173 |
| 2005/0161207 A1 | * | 7/2005 | Powers et al. | 165/173 |
| 2009/0095458 A1 | * | 4/2009 | Lim et al. | 165/174 |

FOREIGN PATENT DOCUMENTS

JP 8-226786 9/1996

* cited by examiner

*Primary Examiner*—Terrell L McKinnon
(74) *Attorney, Agent, or Firm*—Oblon, Spivak, McClelland, Maier & Neustadt, L.L.P.

(57) ABSTRACT

Each header tank includes a tank body and a header plate. The tank body includes a top wall, shorter side walls, and longer side walls. Each shorter side wall has joining portions integrally formed via rounded connection portions and extending along the inner surfaces of the longer side walls. The header plate includes a closure wall, shorter side walls, and longer side walls. End portions of each longer side wall of the tank body are curved along the rounded connection portions to form first bent portions. End portions of each longer side wall of the header plate are curved along the first bent portions to form second bent portions. The shorter side walls of the header plate have deformation portions which enter recesses formed between the rounded connection portions of the tank body and tip end surfaces of the first bent portions.

9 Claims, 9 Drawing Sheets

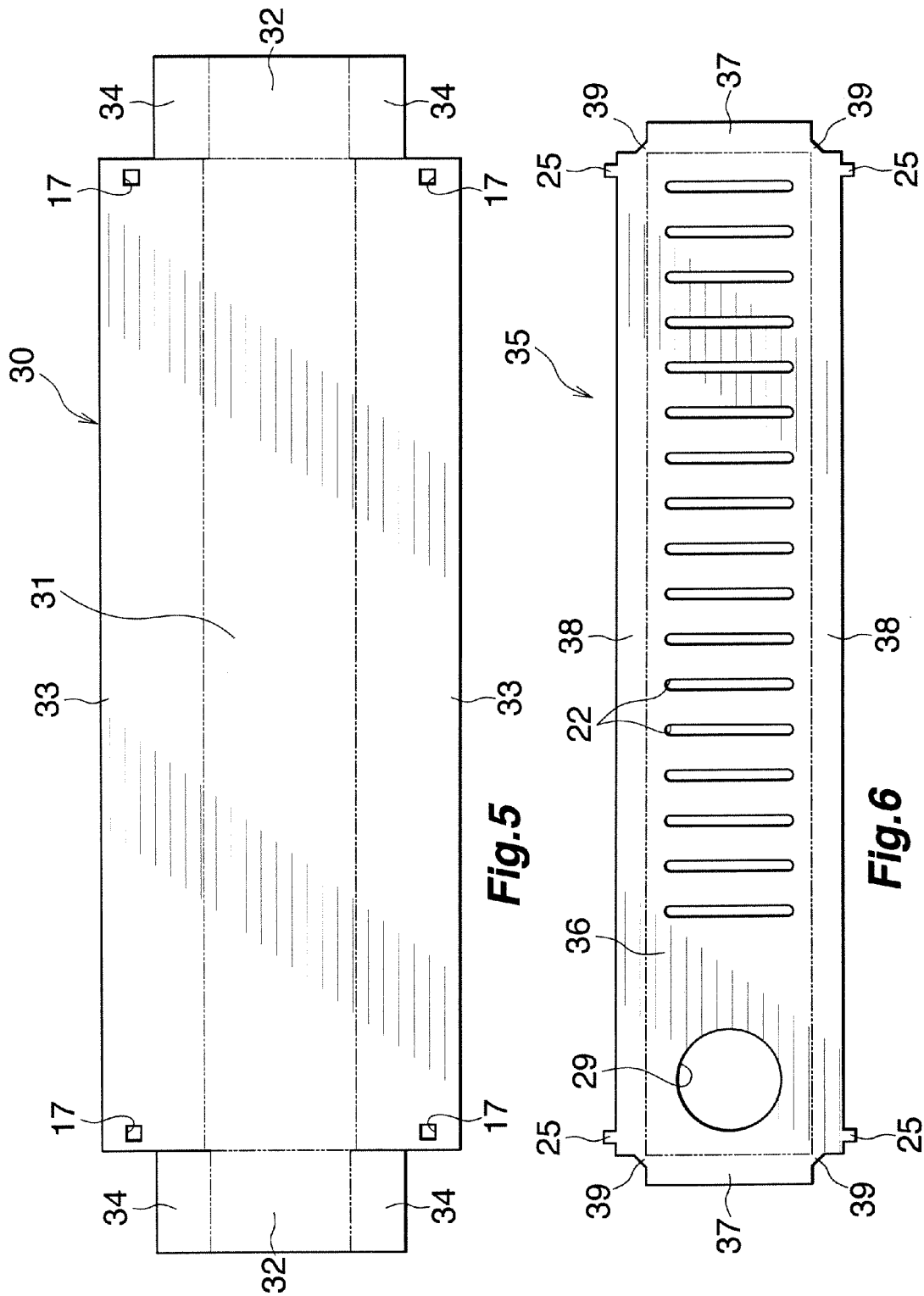

HEAT EXCHANGER AND METHOD OF MANUFACTURING THE SAME

BACKGROUND OF THE INVENTION

The present invention relates to a heat exchanger preferably used as, for example, a heater core to be incorporated into a car air conditioner for a vehicle, and to a method of manufacturing the same.

A heat exchanger is widely used as a heater core for a car air conditioner for heating the interior of a vehicle compartment by making use of warm cooling water for cooling an engine. Such a heat exchanger includes a pair of header tanks spaced apart from each other; a plurality of flat heat exchange tubes which are disposed between the two header tanks at predetermined intervals along a longitudinal direction of the header tanks with their width direction coinciding with an air flow direction and whose opposite end portions are connected to the corresponding header tanks; and a plurality of corrugate fins each disposed between the adjacent heat exchange tubes.

Each header tank of a heat exchanger of such a type includes a box-shaped, rectangular parallelepiped tank body which opens toward the other header tank, and a header plate brazed to an open end portion of the tank body and closing the opening of the tank body. The tank body and the header plate are each formed by means of bending a metal blank. The tank body includes a rectangular top wall; a pair of first side walls extending from one pair of parallel sides of the top wall; and a pair of second side walls extending from the other pair of parallel sides of the top wall. Of the adjacent first and second side walls of the tank body, the first side wall has a joining portion which is formed integrally with the first side wall via a rounded connection portion and which extends along the inner surface of the second side wall. The header plate includes a rectangular closure wall having a plurality of tube insertion holes; a pair of first side walls extending from one pair of parallel sides of the closure wall and extending along the outer surfaces of opening-side end portions of the first side walls of the tank body; and a pair of second side walls extending from the other pair of parallel sides of the closure wall and extending along the outer surfaces of opening-side end portions of the second side walls of the tank body (see Japanese Patent Application Laid-Open (kokai) No. H8-226786).

However, since the header tanks described in the publication are formed by means of bending metal plates, relatively large recesses are unavoidably formed between the outer surfaces of the rounded connection portions of the tank body and tip end surfaces of the bent portions. As a result, at portions where the above-mentioned recesses are present, relatively large clearances are present between the first and second side walls of the tank body and the first and second side walls of the header plate, and brazing failure may occur between the tank body and the header plate. Such brazing failure must be repaired at a later time, and the repair work is troublesome.

SUMMARY OF THE INVENTION

An object of the present invention is to solve the above problem and to provide a heat exchanger and a method of manufacturing the same which can suppress occurrence of brazing failure between tank bodies and header plates.

To achieve the above object, the present invention comprises the following modes.

1) A heat exchanger comprising:

a pair of header tanks spaced apart from each other;

a plurality of flat heat exchange tubes which are disposed between the two header tanks at predetermined intervals along a longitudinal direction of the header tanks with their width direction coinciding with an air flow direction and whose opposite end portions are connected to the corresponding header tanks; and a plurality of fins each disposed between the adjacent heat exchange tubes, wherein each header tank includes a box-shaped tank body which opens toward the other header tank, and a header plate joined to an open end portion of the tank body and closing the opening of the tank body;

the tank body and the header plate are each formed by means of bending a metal blank;

the tank body includes a rectangular top wall, a pair of first side walls extending from one pair of parallel sides of the top wall. and a pair of second side walls extending from the other pair of parallel sides of the top wall;

of each pair of the first and second side walls of the tank body located adjacent to each other, the first side wall has a joining portion which is formed integrally with the first side wall via a rounded connection portion and which extends along the inner surface of the second side wall;

the header plate includes a rectangular closure wall having a plurality of tube insertion holes, a pair of first side walls extending from one pair of parallel sides of the closure wall and extending along the outer surfaces of opening-side end portions of the first side walls of the tank body, and a pair of second side walls extending from the other pair of parallel sides of the closure wall and extending along the outer surfaces of opening-side end portions of the second side walls of the tank body;

opposite end portions of the heat exchange tubes are inserted into the tube insertion holes of the header plate and are joined to the header plate;

a first-side-wall-side end portion of each second side wall of the tank body is curved along an outer surface of the corresponding rounded connection portion to thereby form a first bent portion;

a first-side-wall-side end portion of each second side wall of the header plate is curved along the first bent portion of the tank body to thereby form a second bent portion; and the first side walls of the header plate have respective deformation portions which enter recesses formed between the outer surfaces of the rounded connection portions of the tank body and tip end surfaces of the first bent portions.

2) A heat exchanger according to par. 1), wherein the joining portion is formed at each of opposite end portions of each first side wall of the tank body.

3) A heat exchanger according to par. 1), wherein brazing-material-bleeding prevention portions, each extending between closure-wall-side end portions of the adjacent first and second side walls of the header plate are formed integrally with the closure wall.

4) A heat exchanger according to par. 1), wherein at least one through hole is formed in a portion of each second side wall of the tank body which portion overlaps one of the joining portions; and a nail portion is integrally formed on the corresponding second side wall of the header plate at a location corresponding to the through hole of the tank body, the nail portion projecting towards the top wall of the tank body and having a tip end portion bent and fitted into the corresponding through hole of the tank body.

5) A heat exchanger according to par. 4), wherein a plurality of the through holes are formed in each of the second side walls of the tank body at intervals in the longitudinal direction of the second side walls.

6) A method of manufacturing a heat exchanger comprising:

cutting a first blank for a tank body from a metal material plate, the first blank including a rectangular top-wall forming portion, a pair of first-side-wall forming portions integrally formed at one pair of parallel sides of the top-wall forming portion; a pair of second-side-wall forming portions integrally formed at the other pair of parallel sides of the top-wall forming portion, and joining-portion forming portions integrally formed at opposite end portions of the first-side-wall forming portions;

cutting a second blank for a header plate from a metal material plate, the second blank including a rectangular closure-wall forming portion, a pair of first-side-wall forming portions integrally formed at one pair of parallel sides of the closure-wall forming portion, a pair of second-side-wall forming portions integrally formed at the other pair of parallel sides of the closure-wall forming portion, and forming a plurality of tube insertion holes in the closure-wall forming portion;

bending the joining-portion forming portions of the first blank in relation to the first-side-wall forming portions, bending the first-side-wall forming portions in relation to the top-wall forming portion, bending the second-side-wall forming portions in relation to the top-wall forming portion, and curving opposite end portions of the second-side-wall forming portions along rounded connection portions between the first-side-wall forming portions and the joining-portion forming portions, to thereby form a tank body member including a rectangular top wall, a pair of first side walls extending from one pair of parallel sides of the top wall, a pair of second side walls extending from the other pair of parallel sides of the top wall, joining portions integrally formed on the first side walls via rounded connection portions and extending along inner surfaces of the second side walls, and first bent portions integrally formed on the second side walls;

bending the first-side-wall forming portions and second-side-wall forming portions of the second blank in relation to the closure-wall forming portion, bending opposite end portions of the second-side-wall forming portions into a shape to extend along the first bent portions of the tank body member, and bending opposite end portions of the first-side-wall forming portions into a shape such that these end portions can enter recesses formed between outer surfaces of the rounded connection portions of the tank body member and tip end surfaces of the first bent portions, to thereby form a header plate member including a rectangular closure wall, a pair of first side walls extending from one pair of parallel sides of the closure wall, a pair of second side walls extending from the other pair of parallel sides of the closure wall, second bent portions which are formed at opposite end portions of the second side walls and can extend along the first bent portions of the tank body member, and deformation portions which are formed at opposite end portions of the first side walls and which can enter recesses formed between the outer surfaces of the rounded connection portions of the tank body member and the tip end surfaces of the bent portions;

fitting the header plate member to an opening-side end portion of the tank body member such that the first and second side walls of the header plate member extend along the outer surfaces of the first and second side walls of the tank body member, forcing the second bent portions of the header plate member to extend along the first bent portions of the tank body member, and forcing the deformation portions of the header plate member to enter the recesses of the tank body member, to thereby produce an assembly of the tank body member and the header plate member;

disposing two assemblies, each composed of the tank body member and the header plate member, such that the header plate members of the assemblies face each other;

combining a plurality of heat exchange tubes and fins alternately, and inserting opposite end portions of the heat exchange tubes into the tube insertion holes of the header plate members of the two assemblies; and brazing the joining portions of the tank body members to the second side walls thereof so as to form tank bodies, brazing the first and second side walls of the header plate members to the first and second walls, respectively, of the tank bodies so as to form header plates, brazing the opposite end portions of the heat exchange tubes to the header plates, and brazing the fins to the heat exchange tubes.

7) A method of manufacturing a heat exchanger according to par. 6), wherein brazing-material-bleeding-prevention-portion forming portions are formed integrally with the closure-wall forming portion such that the brazing-material-bleeding-prevention-portion forming portions extend between end portions of the first-side-wall forming portions and second-side-wall forming portions of the second blank, the end portions being located adjacent to the closure-wall forming portion; and when the header plate member is produced, brazing-material bleeding prevention portions extending between closure-wall-side end portions of the adjacent first and second side walls of the header plate member is formed integrally with the closure wall by the brazing-material-bleeding-prevention-portion forming portions.

8) A method of manufacturing a heat exchanger according to par. 6), wherein at least one through hole is formed in a portion of each second-side-wall forming portion of the first blank, which portion overlaps one of the joining-portion forming portions; an outwardly projecting nail portion is integrally formed on the corresponding second-side wall forming portion of the second blank at a location corresponding to the through hole of the first blank; and when the assembly of the tank body member and the header plate member is produced, the nail portion is bent and fitted into the corresponding through hole.

9) A method of manufacturing a heat exchanger according to par. 8), wherein a plurality of the through holes are formed in portions of each second-side-wall forming portion of the first blank, which portions are to overlap the joining-portion forming portions, at intervals in the longitudinal direction of the second-side-wall forming portion.

In the heat exchangers of pars. 1) and 2), a first-side-wall-side end portion of each second side wall of the tank body is curved along an outer surface of the corresponding rounded connection portion to thereby form a first bent portion; a first-side-wall-side end portion of each second side wall of the header plate is curved along the first bent portion of the tank body to thereby form a second bent portion; and the first side walls of the header plate have respective deformation portions which enter recesses formed between the outer surfaces of the rounded connection portions of the tank body and tip end surfaces of the first bent portions. Therefore, even at portions where the above-mentioned recesses are present, the clearances formed between the first and second side walls of the tank body and the first and second side walls of the header plate become smaller as compared with the case of the header tank disclosed in the above-described publication. Accordingly, it is possible to suppress occurrence of brazing failure between the tank body and the header plate.

In the heat exchanger of par. 3), brazing-material-bleeding prevention portions, each extending between closure-wall-side end portions of the adjacent first and second side walls of the header plate are formed integrally with the closure wall.

Therefore, when the tank body and the header plate are brazed together, the brazing-material bleeding prevention portions prevent bleeding of the molten brazing material through the clearances between the first and second side walls. Accordingly, the occurrence of brazing failure between the tank body and the header plate can be suppressed more effectively.

In the heat exchangers of pars. 4) and 5), the tank body and the header plate can be reliably positioned before brazing.

According to the method of manufacturing a heat exchanger of par. 6), when the tank body member is manufactured, the joining-portion forming portions of the first blank are bent in relation to the first-side-wall forming portions, the first-side-wall forming portions are bent in relation to the top-wall forming portion, the second-side-wall forming portions are bent in relation to the top-wall forming portion, and opposite end portions of the second-side-wall forming portions are curved along the rounded connection portions between the first-side-wall forming portions and the joining-portion forming portions to thereby form first bent portions. Further, when the header plate member is manufactured, the first-side-wall forming portions and second-side-wall forming portions of the second blank are bent in relation to the closure-wall forming portion, opposite end portions of the second-side-wall forming portions are bent into a shape to extend along the first bent portions of the tank body member to thereby form second bent portions, and opposite end portions of the first-side-wall forming portions are deformed into a shape such that these end portions can enter the recesses formed between the outer surfaces of the rounded connection portions of the tank body member and the tip end surfaces of the bent portions to thereby form deformation portions. Accordingly, at the time of brazing in a subsequent step, smaller clearances as compared with the case of the header tank disclosed in the above-described publication are formed between the first and second side walls of the tank body and the first and second side walls of the header plate, even at portions where recesses are formed between the outer surfaces of the rounded connection portions of the tank body and the tip end surfaces of the first bent portions. Therefore, it is possible to suppress occurrence of brazing failure between the tank body and the header plate in the manufactured heat exchanger.

According to the method of manufacturing a heat exchanger of par. 7), brazing-material-bleeding-prevention-portion forming portions are formed integrally with the closure-wall forming portion such that the brazing-material-bleeding-prevention-portion forming portions extend between end portions of the first-side-wall forming portions and second-side-wall forming portions of the second blank, the end portions being located adjacent to the closure-wall forming portion; and when the header plate member is produced, brazing-material bleeding prevention portions extending between closure-wall-side end portions of the adjacent first and second side walls of the header plate member is formed integrally with the closure wall by the brazing-material-bleeding-prevention-portion forming portions. Therefore, when the tank body member and the header plate member are brazed together, the brazing-material bleeding prevention portions prevent bleeding of the molten brazing material through the clearances between the first and second side walls. Accordingly, the occurrence of brazing failure between the tank body and the header plate in the manufactured heat exchanger can be suppressed more effectively.

According to the methods of manufacturing a heat exchanger of pars. 8) and 9), when the tank body member and the header plate member are assembled together, the two members can be reliably positioned.

BRIEF DESCRIPTION OF THE DRAWINGS

FIG. 5 is a plan view showing a first blank for tank body;

FIG. 6 is a plan view showing a second blank for header plate;

DESCRIPTION OF THE PREFERRED EMBODIMENT

A preferred embodiment of the present invention will next be described with reference to the drawings. The present embodiment is an application of a heat exchanger of the present invention to a heater core of a car air conditioner.

Figure 1:
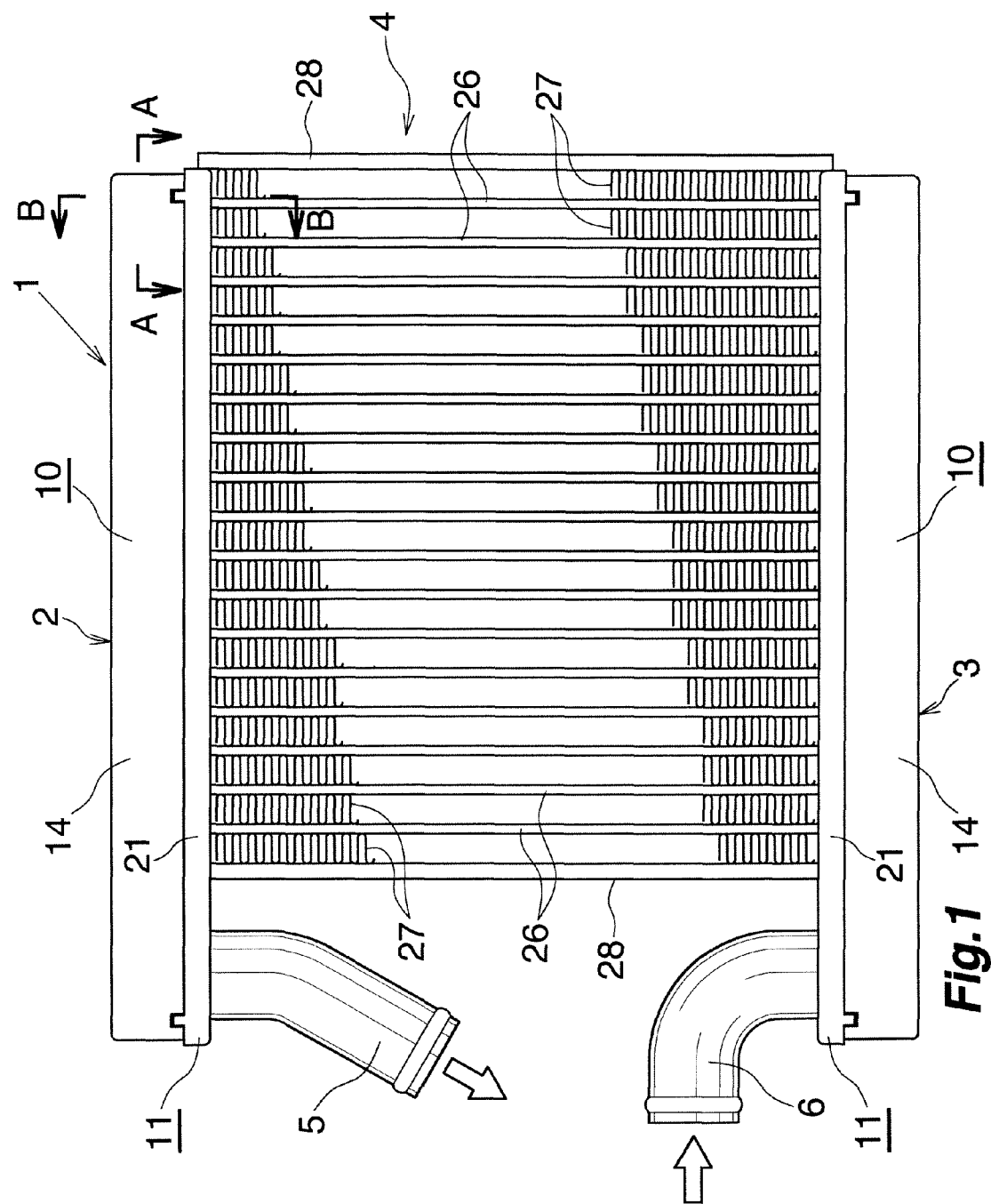
FIG. 1 is a front view showing the overall configuration of a heater core for a car air conditioner to which a heat exchanger of the present invention is applied.

In the description of the heater core in relation to FIGS. 1 to 4, the upper, lower, left-hand, and right-hand sides of FIG. 1 will be referred to as "upper," "lower," "left," and "right," respectively; and the far side of the paper on which FIG. 1 appears (the upper side of FIG. 2) is referred to as the "front," and the opposite side as the "rear."

Figure 2:
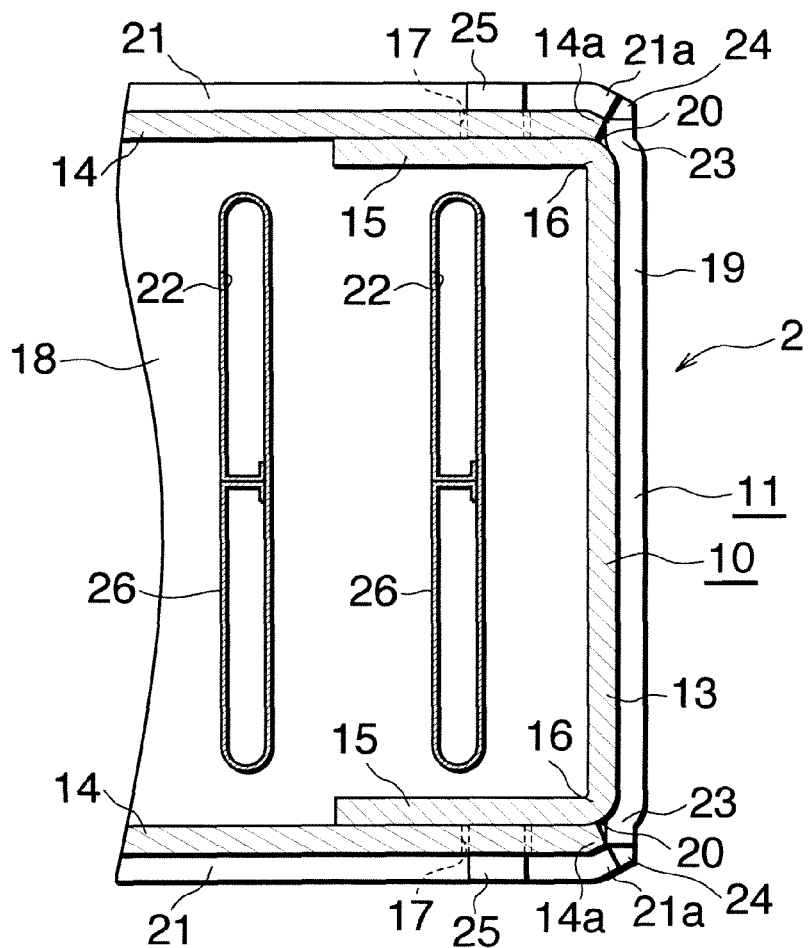
FIG. 2 is an enlarged sectional view taken along line A-A of FIG. 1.
Figure 3:
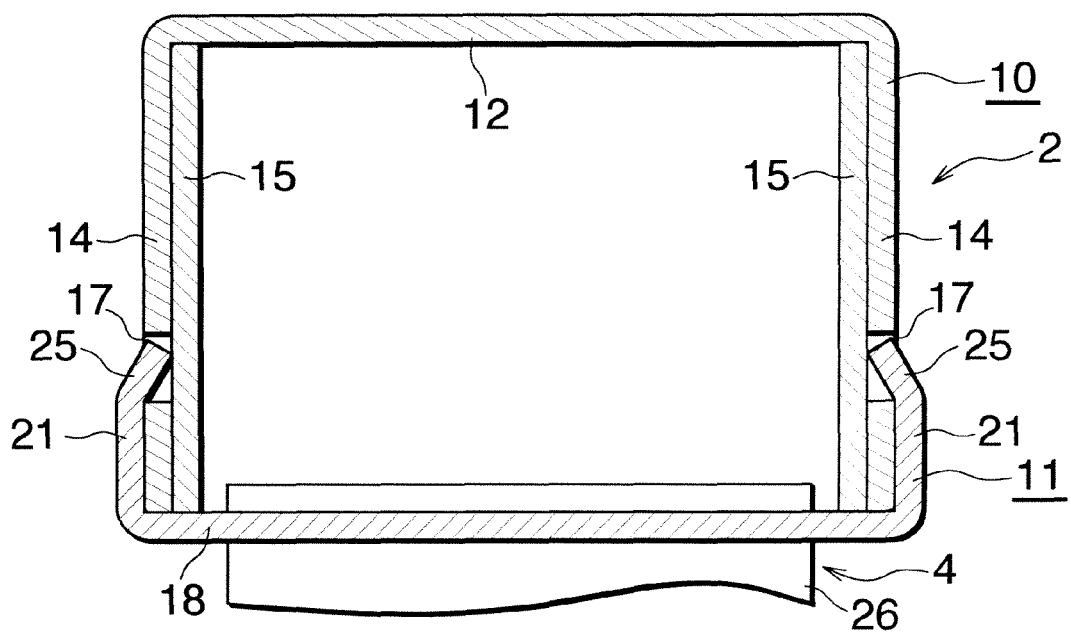
FIG. 3 is an enlarged sectional view taken along line B-B of FIG. 1.
Figure 4:
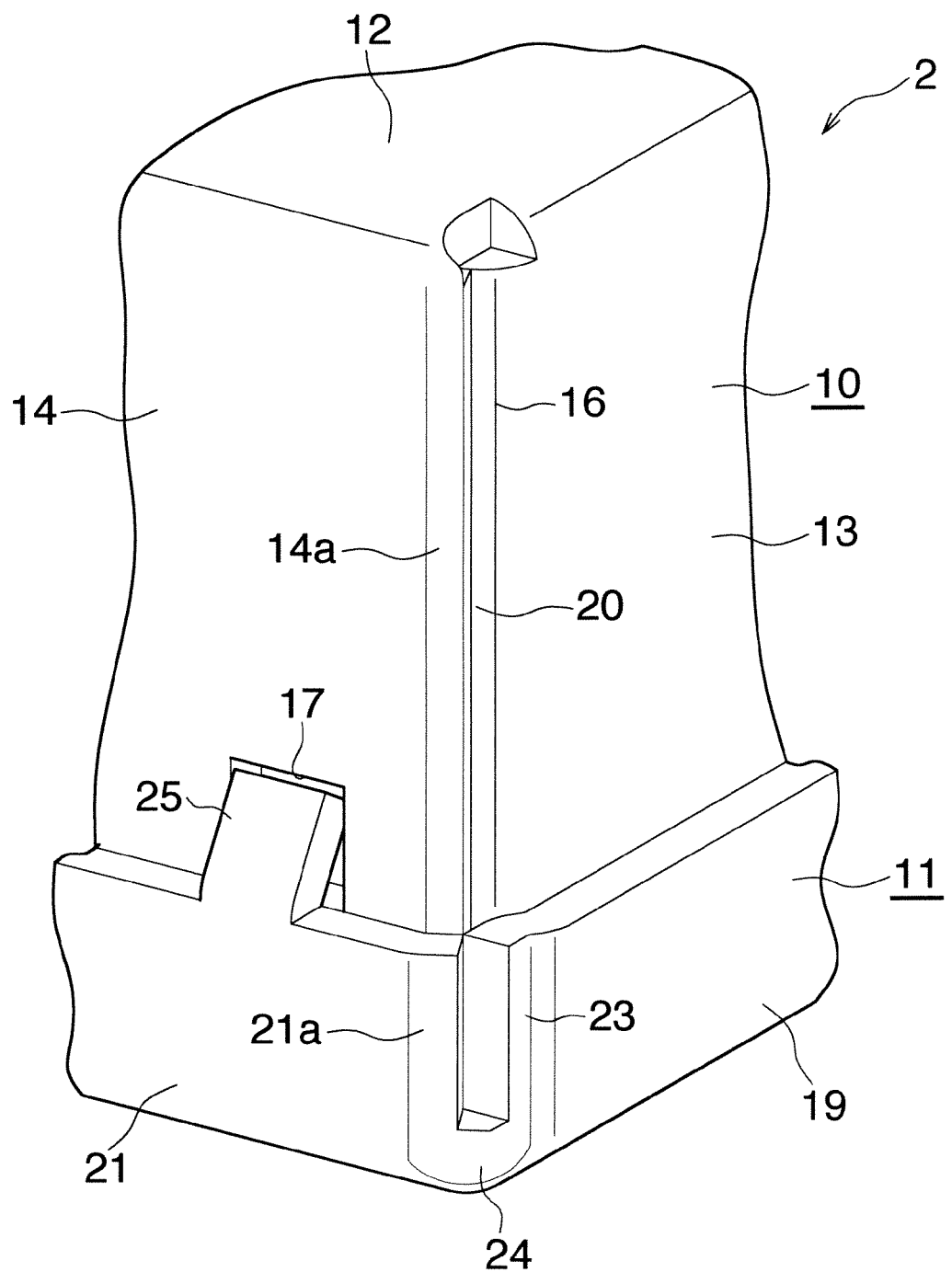
FIG. 4 is an enlarged partial perspective view showing a corner portion of an upper header tank.
Figures 7A, 7B:
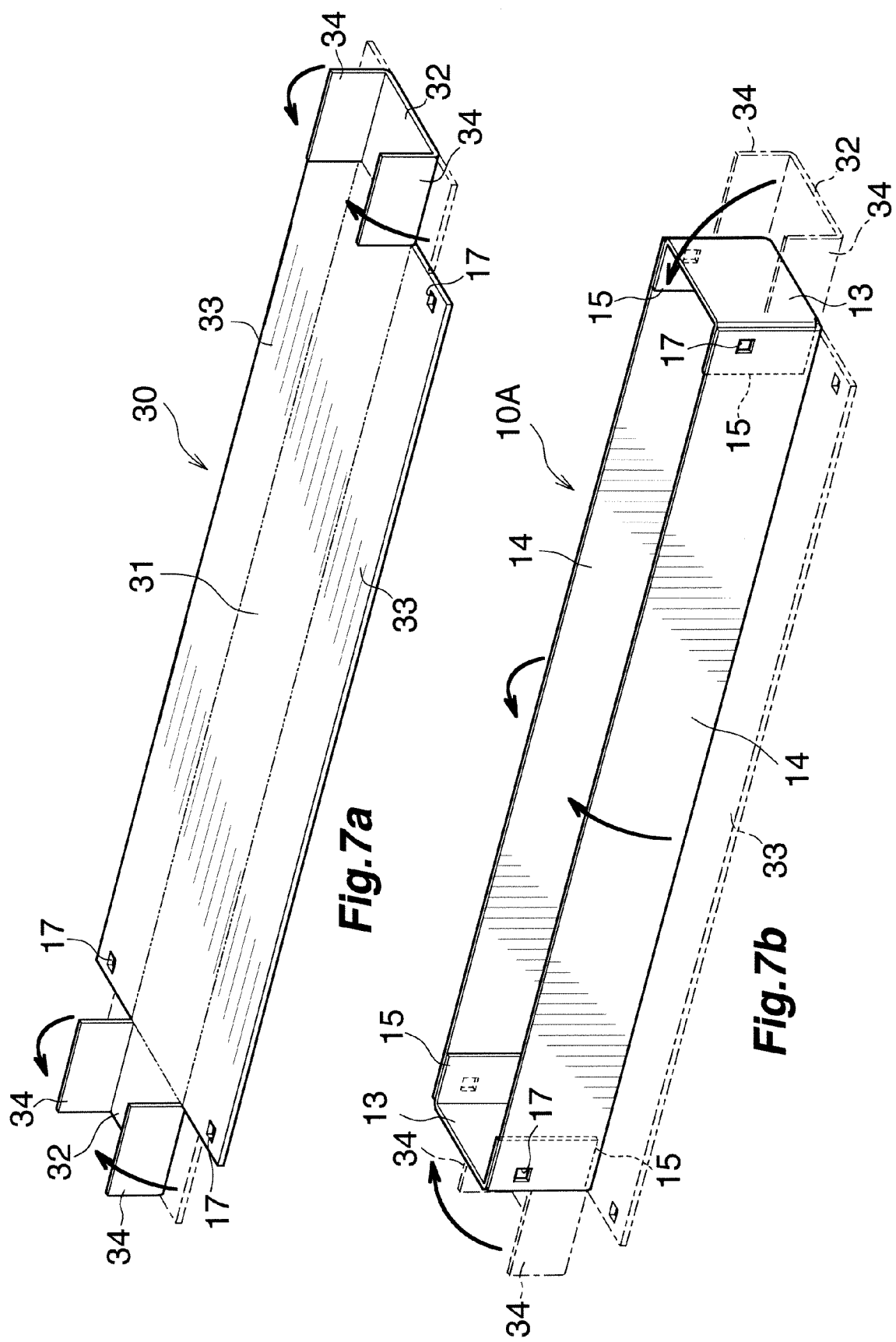
FIG. 7a is a perspective view showing a step of a method of forming a tank body member from the first blank.
FIG. 7b is a perspective view showing another step, different from that of FIG. 7a, of the method of forming a tank body member from the first blank.
Figure 8A:
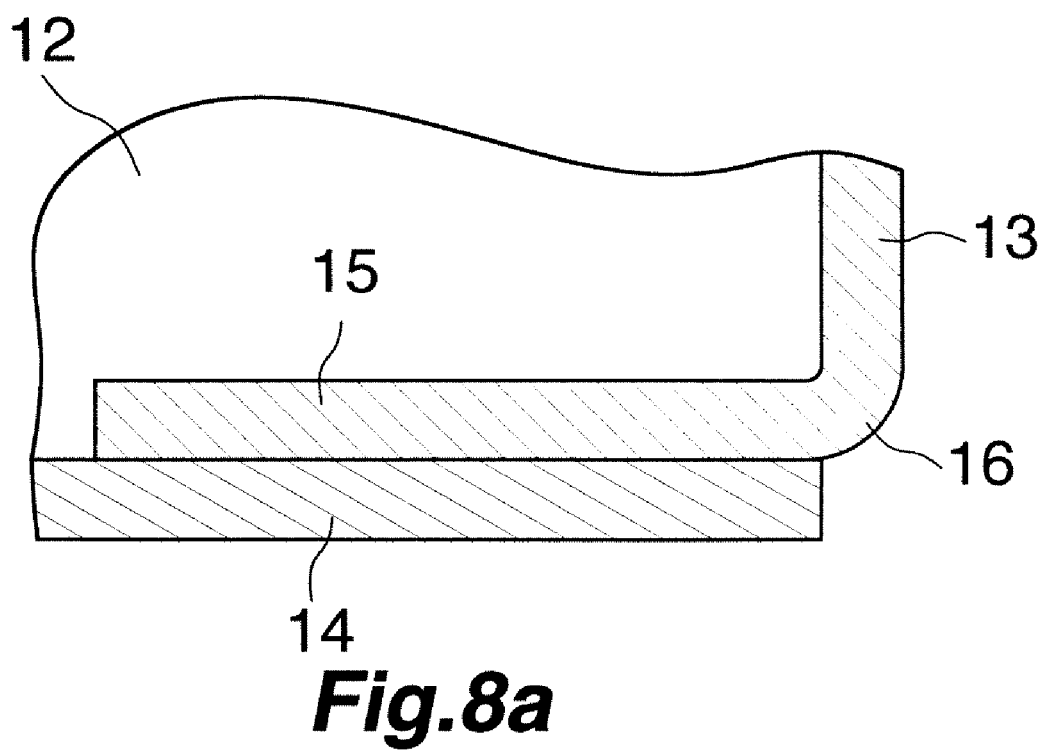
FIG. 8a is an enlarged partial horizontal cross section showing another step of the method of forming a tank body member from the first blank.
Figure 8B:
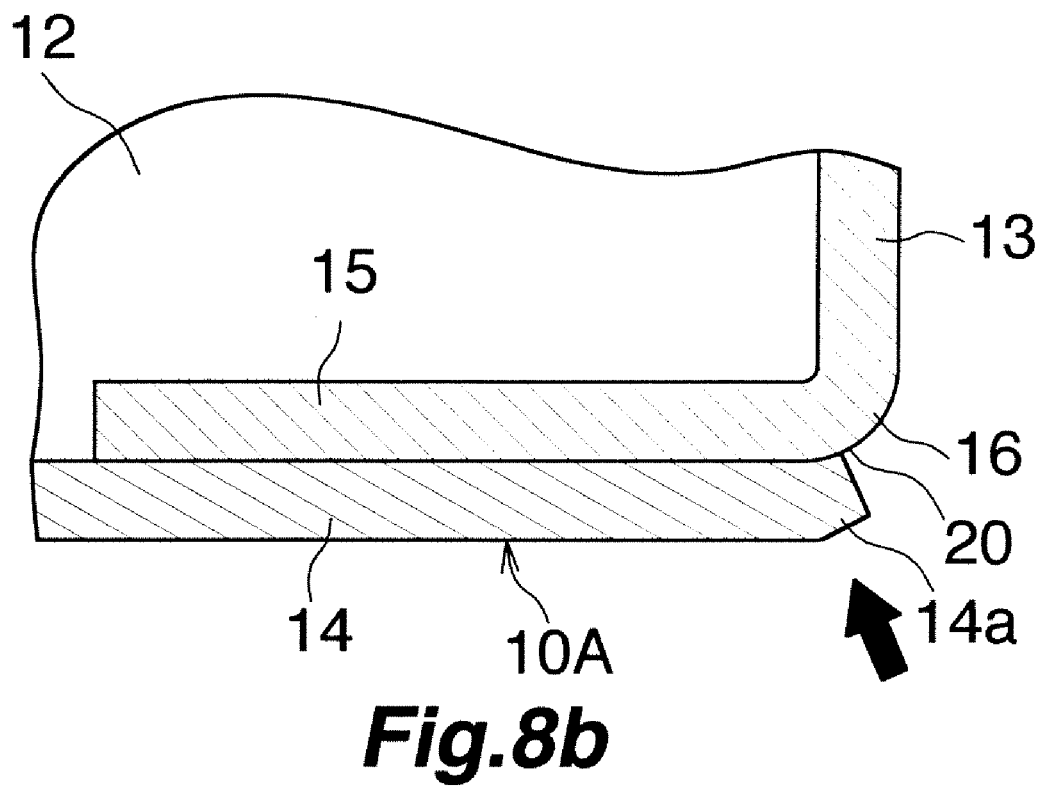
FIG. 8b is an enlarged partial horizontal cross section showing another step, different from that of FIG. 8a, of the method of forming a tank body member from the first blank.
Figure 9:
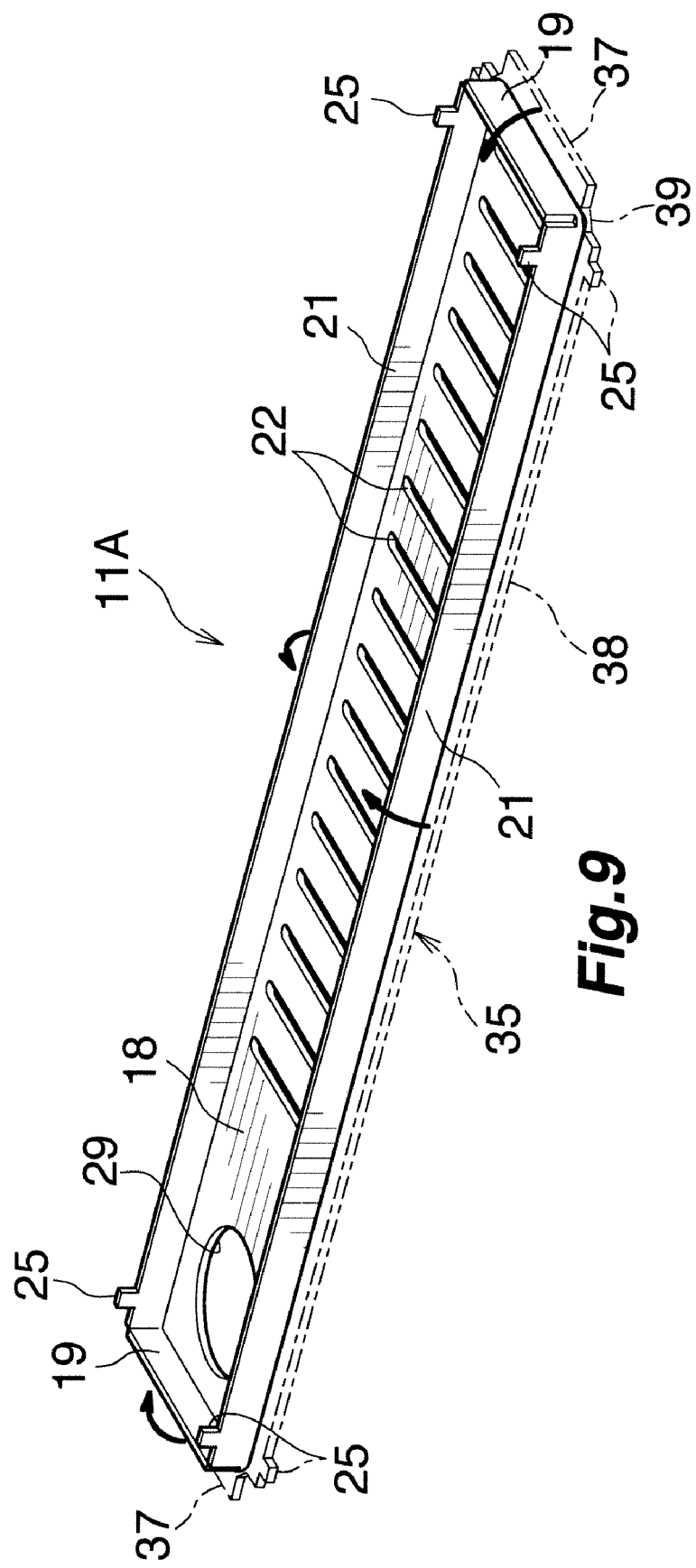
FIG. 9 is a perspective view showing a method of forming a header plate member from the second blank.
Figure 10:
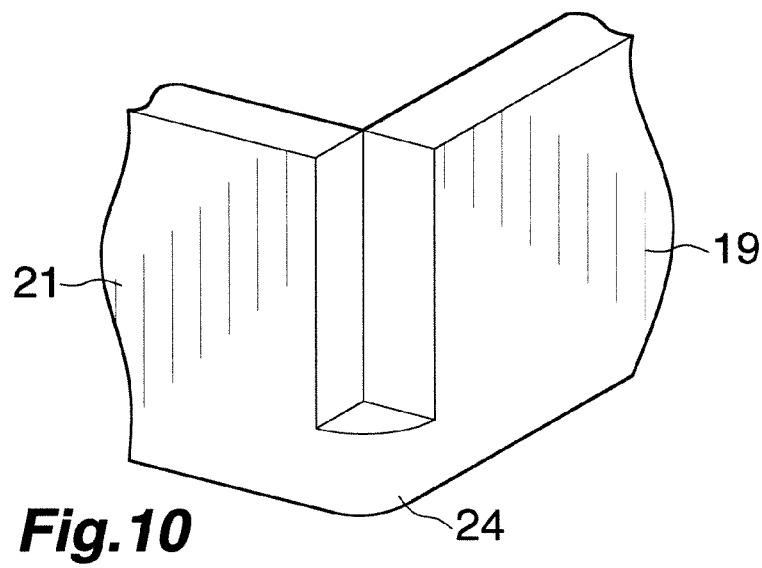
FIG. 10 is an enlarged view of a portion of FIG. 9.
Figure 11A:
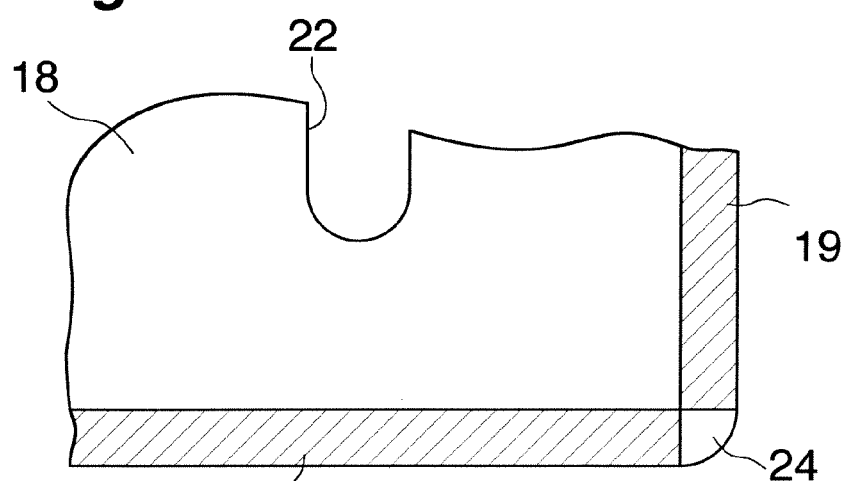
FIG. 11a is an enlarged partial horizontal cross section showing a step of a method of forming a header plate member from the second blank.
Figure 11B:
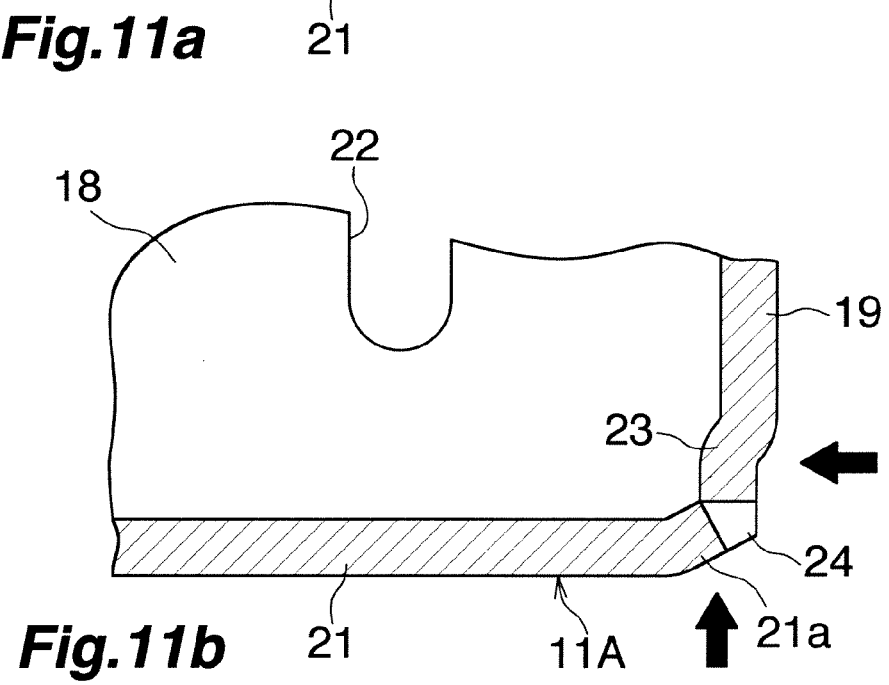
FIG. 11b is an enlarged partial horizontal cross section showing another step, different from that of FIG. 11a, of the method of forming a header plate member from the second blank.
Figure 12:
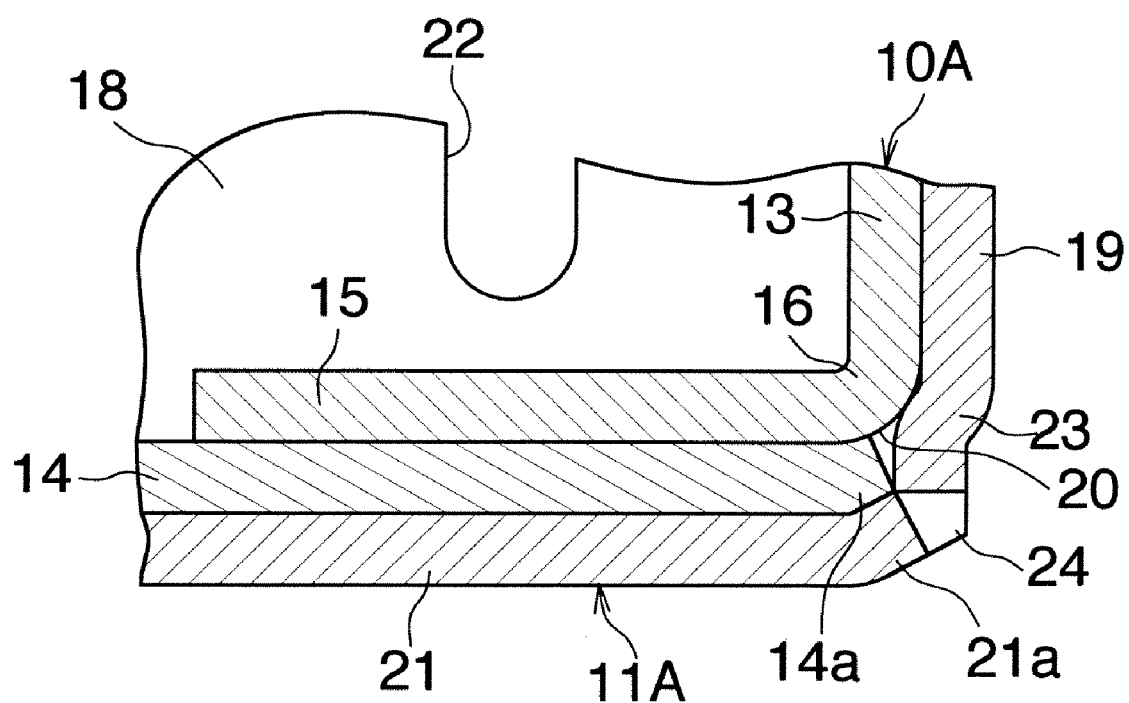
FIG. 12 is an enlarged partial horizontal cross section showing a portion of an assembly of the tank body member and the header plate member.

FIG. 1 shows the general configuration of a heater core for a car air conditioner to which a heat exchanger of the present invention is applied. FIGS. 2 to 4 show the configuration of essential portions of the heater core.

In FIG. 1, a heater core 1 includes an upper header tank 2 and a lower header tank 3 which are made of aluminum, are vertically spaced apart from each other, and are elongated in the left-right direction, and a heat exchange core section 4 provided between the upper and lower header tanks 2 and 3. Left end portions of the upper and lower header tanks 2 and 3 project leftward beyond the heat exchange core section 4. An outlet pipe 5 is connected to a leftward-projecting portion of the upper header tank 2, and an inlet pipe 6 is connected to a leftward-projecting portion of the lower header tank 3.

The upper header tank 2 includes a box-shaped, rectangular parallelepiped tank body 10 which opens downward and which is elongated in the left-right direction, and a header plate 11 joined to an open end portion of the tank body 10 and closing the opening of the tank body 10. The tank body 10 is formed by means of bending a metal material plate, which is an aluminum brazing sheet having a brazing material layer on one side thereof, in such a manner that the brazing material comes to the outside, and brazing the metal material plate at predetermined locations. The header plate 11 is formed by means of bending a metal material plate, which is an aluminum brazing sheet having a brazing material layer on one side thereof, in such a manner that the brazing material comes to the outside. The header plate 11 is brazed to the tank body 10 at predetermined locations.

As shown in FIGS. 2 to 4, the tank body 10 includes a rectangular top wall 12 extending in the left-right direction; a pair of shorter side walls 13 extending from left and right shorter sides of the top wall 12; and a pair of longer side walls 14 extending from the front and rear longer sides of the top wall 12. One of the adjacent shorter and longer side walls 13 and 14 of the tank body 10; in the present embodiment, the shorter side walls 13, have joining portions 15 which are integrally formed at front and rear end portions of the shorter side walls 13 via rounded connection portions 16 and which extend along the inner surfaces of the longer side walls 14. The joining portions 15 are brazed to the inner surfaces of the longer side walls 14. Accordingly, in the present embodiment, the shorter side walls 13 of the tank body 10 serve as first side walls, and the longer side walls 14 of the tank body 10 serve as second side walls. Left and right end portions of the longer side walls 14 of the tank body 10 are curved along the outer surfaces of the rounded connection portions 16, so that the longer side walls 14 have first bent portions 14*a* extending along the outer surfaces of the rounded connection portions 16. Thus, recesses 20 are formed between the outer surfaces of the rounded connection portions 16 of the tank body 10 and the tip end surfaces of the first bent portions 14*a*. Further, through holes 17 are formed in the lower sides of portions of the left and right end portions of each longer side wall 14 of the tank body 10, the portions overlapping the corresponding joining portions 15.

The header plate 11 includes a rectangular closure wall 18 extending in the left-right direction; a pair of shorter side walls 19 which extend from left and right shorter sides of the closure wall 18, extend along the outer surfaces of opening-side end portions (lower end portions) of the shorter side walls 13 of the tank body 10, and are brazed thereto; and a pair of longer side walls 21 which extend from front and rear longer sides of the closure wall 18, extend along the outer surfaces of opening-side end portions of the longer side walls 14 of the tank body 10, and are brazed thereto. A plurality of tube insertion holes 22 extending in the front-rear direction are formed in the closure wall 18 at predetermined intervals in the left-right direction. In the present embodiment, the shorter side walls 19 of the header plate 11 serve as first side walls, and the longer side walls 21 of the header plate 11 serve as second side walls. Left and right end portions of the longer side walls 21 of the header plate 11 are curved along the first bent portions 14*a* of the tank body 10, so that the longer side walls 21 have second bent portions 21*a* extending along the outer surfaces of the first bent portions 14*a*. Each shorter side wall 19 of the header plate 11 has inwardly projecting deformation portions 23 which are formed at front and rear end portions thereof and which enter the recesses 20, which are formed between the outer surfaces of the rounded connection portions 16 of the tank body 10 and the tip end surfaces of the first bent portions 14*a*. Further, the closure wall 18 has brazing-material bleeding prevention portions 24 integrally formed to extend between lower end portions of the front and rear ends of each shorter side wall 19 of the header plate 11 and lower end portions of the left and right ends of each longer side wall 21 of the header plate 11. Further, nail portions 25 are integrally formed at the left and right end portions of each longer side wall 21 of the header plate 11. The nail portions 25 project toward the top wall 12 of the tank body 10, and their tip end portions are bent inward with respect to the front-rear direction and fitted into the corresponding through holes 17 of the longer side walls 14 of the tank body 10.

The lower header tank 3 is the same as the upper header tank 2 but is inverted. Therefore, like members and like portions are denoted by the same reference numerals.

The heat exchange core section 4 includes a plurality of flat heat exchange tubes 26 made of aluminum which are disposed at predetermined intervals along the left-right direction with their width direction coinciding with the front-rear direction (air flow direction) and whose upper and lower end portions are connected to the upper and lower header tanks 2 and 3, respectively; a plurality of corrugate fins 27 made of aluminum which are each disposed between adjacent heat exchange tubes 26 and outside the leftmost and rightmost heat exchange tubes 26 and are brazed to the heat exchange tubes 26; and two side plates 28 disposed outside and brazed to the corresponding leftmost and rightmost corrugate fins 27. Each heat exchange tube 26 is formed by tubularly bending an elongated aluminum brazing sheet having a brazing material layer on at least one side thereof, in such a manner that the brazing material comes to the outside, and brazing the sheet. The upper and lower end portions of the heat exchange tubes 26 are brazed to the upper and lower header tanks 2 and 3, respectively, while being inserted into corresponding tube insertion holes 22 formed in the closure walls 18 of the header plates 11 of the upper and lower header tanks 2 and 3. The outlet pipe 5 and the inlet pipe 6 are brazed to the upper and lower header tanks 2 and 3, respectively, while being inserted into corresponding refrigerant passage holes 29 (see FIG. 6) formed in the closure walls 18 of the header plates 11 of the upper and lower header tanks 2 and 3.

Next, a method of manufacturing the heater core 1 will be described with reference to FIGS. 5 to 12.

In the description of the method of manufacturing the heater core 1, the left-hand and right-hand sides of FIGS. 5 and 6 will be referred to as "left" and "right," respectively; and the upper side of each figure is referred to as the "front," and the opposite side as the "rear."

First, a first blank 30 for the tank body 10 is cut from a metal material plate, which is an aluminum brazing sheet having a brazing material layer on one side thereof. The first blank 30 includes a rectangular top-wall forming portion 31 extending in the left-right direction; a pair of shorter-side-wall forming portions 32 integrally formed at opposite shorter sides of the top-wall forming portion 31; a pair of longer-side-wall forming portions 33 integrally formed at opposite longer sides of the top-wall forming portion 31; and joining-portion forming portions 34 integrally formed at front and rear end portions of the shorter-side-wall forming portions 32 (see FIG. 5). When the first blank 30 is cut, through holes 17 are formed in the left and right end portions of each longer-side-wall forming portion 33 near the outer edge thereof with respect to the front-rear direction. The through holes 17 are formed in portions of the longer-side-wall forming portions 33, which portions are to overlap the joining-portion forming portions 34 at the time of bending of the first blank 30, which will be described later. The width of the shorter-side-wall forming portions 32 as measured in the front-rear direction is narrower than that of the top-wall forming portion 31 by an amount two times the thickness of the first blank 30, so that the front and rear ends of the shorter-side-wall forming portions 32 are located inward, with respect to the front-rear direction, from the front and rear side edges of the top-wall forming portion 31 by an amount corresponding to the thickness of the first blank 30.

Further, a second blank 35 for the header plate 11 is cut from a metal material plate, which is an aluminum brazing sheet having a brazing material layer on one side thereof. The second blank 35 includes a rectangular closure-wall forming portion 36 extending in the left-right direction; a pair of shorter-side-wall forming portions 37 integrally formed at opposite shorter sides of the closure-wall forming portion 36; a pair of longer-side-wall forming portions 38 integrally formed at opposite longer sides of the closure-wall forming portion 36; nail portions 25 integrally formed at the left and right ends of the longer-side-wall forming portions 38 such that they project outward with respect to the front-rear direction; and brazing-material-bleeding-prevention-portion forming portions 39 which are formed integrally with the closure-wall forming portion 36 and which extend between end portions of the front and rear ends of the shorter-side-wall forming portions 37, the end portion being located adjacent to the closure-wall forming portion 36, and end portions of the left and right ends of the longer-side-wall forming portions 38, the end portion being located adjacent to the closure-wall forming portion 36 (see FIG. 6). When the second blank 35 is cut, a plurality of tube insertion holes 22 and the refrigerant passage hole 29 are formed in the closure-wall forming portion 36. The nail portions 25 are formed in portions which correspond to the through holes 17, when a tank body member 10A and a header plate member 11A, which will be described later, are assembled together.

Subsequently, as shown in FIGS. 7a, 7b, 8a, and 8b, the joining-portion forming portions 34 of the first blank 30 are bent in relation to the short-side-wall forming portions 32, and the short-side-wall forming portions 32 are bent in relation to the top-wall forming portion 31 such that the brazing material layer faces outward. Further, the longer-side-wall forming portions 33 are bent in relation to the top-wall forming portion 31 such that the brazing material layer faces outward, and opposite end portions of the longer-side-wall forming portions 33 are curved along rounded connection portions 16 between the short-side-wall forming portions 32 and the joining-portion forming portions 34. Thus is formed a tank body member 10A, which includes a rectangular top wall 12; a pair of shorter side walls 13 extending from opposite shorter sides of the top wall 12; a pair of longer side walls 14 extending from opposite longer sides of the top wall 12; joining portions 15 integrally formed on the shorter side walls 13 via rounded connection portions 16 and extending along the inner surfaces of the longer side walls 14; and first bent portions 14a integrally formed on the longer side walls 14. Thus, recesses 20 are formed between the outer surfaces of the rounded connection portions 16 of the tank body member 10A and the tip end surfaces of the first bent portions 14a.

Moreover, as shown in FIGS. 9, 10, 11a, and 11b, the short-side-wall forming portions 37 and the longer-side-wall forming portions 38 of the second blank 35 are bent in relation to the closure-wall forming portion 36 such that the brazing material layer faces outward, and the brazing-material-bleeding-prevention-portion forming portions 39 are drawn. Further, left and right end portions of the longer-side-wall forming portions 38 are bent into a shape to extend along the first bent portions 14a of the tank body member 10A, and front and rear end portions of the shorter-side-wall forming portions 37 are deformed into a shape such that these end portions can enter the recesses 20 of the tank body member 10A. Thus is formed a head plate material 11A, which includes a rectangular closure wall 18; a pair of shorter side walls 19 extending from opposite shorter sides of the closure wall 18; a pair of longer side walls 21 extending from opposite longer sides of the closure wall 18; second bent portions 21a which are integrally formed on the longer side walls 21 and can extend along the first bent portions 14a; deformation portions 23 which can enter the recesses 20 formed between the outer surfaces of the rounded connection portions 16 of the tank body member 10A and the tip end surfaces of the first bent portions 14a; and brazing-material bleeding prevention portions 24 extending between the closure-wall 18 side end portions of the shorter side walls 19 and the longer side walls 21 of the header plate member 11A.

Subsequently, the header plate member 11A is fitted to the opening-side end portion of the tank body member 10A, such that the shorter side walls 19 and the longer side walls 21 of the header plate member 11A extend along the outer surfaces of the shorter side walls 13 and the longer side walls 14 of the tank body member 10A. The deformation portions 23 of the header plate member 11A are forced to enter the recesses 20 of the tank body member 10A (see FIG. 12). Further, the nail portions 25 of the header plate member 11A are bent inward so as to fit into the through holes 17 of the tank body member 10A. Thus, an assembly of the members 10A and 11B is formed.

Subsequently, two assemblies are disposed with a distance therebetween such that the header plate members 11A of the assemblies face each other. Further, a plurality of heat exchange tubes 26 and corrugate fins 27 are alternately combined such that the corrugate fins 27 are located at opposite ends. Side plates 28 are disposed on the outer sides of the corrugate fins 27 at the opposite ends. Then, opposite end portions of the heat exchange tubes 26 are inserted into the tube insertion holes 22 of the header plate members 11A of the two assemblies. Further, the outlet pipe 5 and the inlet pipe 6 are inserted into the corresponding refrigerant passage holes 29 of the header plate members 11A of the assemblies. Then, all the components are provisionally fixed by use of a proper jig.

Subsequently, all the components provisionally fixed are heated to a predetermined temperature so as to braze the joining portions 15 of the tank body members 10A to the longer side walls 14 and braze the bent portions 14a to the outer surfaces of the rounded connection portions 16 to thereby form the tank bodies 10, and so as to braze the shorter side walls 19 and the longer side walls 21 of the header plate members 11A to the shorter side walls 13 and the longer side walls 14 of the tank bodies 10, braze the bent portions 21a to the bent portions 14a, and braze the deformation portions 23 to the outer surfaces of the rounded connection portions 16 to thereby form the header plates 11. At the same time, the opposite end portions of the heat exchange tubes 26 are brazed to the header plates 11, the corrugate fins 27 are brazed to the heat exchange tubes 26, and the side plates 28 are brazed to the corresponding corrugate fins 27. In this manner, the heater core 1 is manufactured.

When the tank body members 10A and the header plate members 11A are brazed together, the brazing-material bleeding prevention portions 24 prevent bleeding of the molten brazing material through the clearances between the shorter side walls 19 and the longer side walls 21 of the header plate members 11A.

In the above-described embodiment, since the joining portions 15 are integrally formed on the shorter side walls 13 of each tank body 10, the shorter side walls 13 serve as first side walls, and the longer side walls 14 serve as second side walls. Thus, the shorter side walls 19 of each header plate 11 serve as first side walls, and the longer side walls 21 thereof serve as second side walls. However, the present invention is not limited thereto. In the case where the joining portions 15 are integrally formed on the longer side walls 14 of each tank body 10, the longer side walls 14 serve as first side walls, and the shorter side walls 13 serve as second side walls. In this case, the longer side walls 21 of each header plate 11 serve as first side walls, and the shorter side walls 19 thereof serve as second side walls.

What is claimed is:

1. A heat exchanger comprising:
a pair of header tanks spaced apart from each other;
a plurality of flat heat exchange tubes which are disposed between the two header tanks at predetermined intervals along a longitudinal direction of the header tanks with their width direction coinciding with an air flow direction and whose opposite end portions are connected to the corresponding header tanks; and
a plurality of fins each disposed between the adjacent heat exchange tubes, wherein
each header tank includes a box-shaped tank body which opens toward the other header tank, and a header plate joined to an open end portion of the tank body and closing the opening of the tank body;
the tank body and the header plate are each formed by means of bending a metal blank;
the tank body includes a rectangular top wall, a pair of first side walls extending from one pair of parallel sides of the top wall, and a pair of second side walls extending from the other pair of parallel sides of the top wall;
of each pair of the first and second side walls of the tank body located adjacent to each other, the first side wall has a joining portion which is formed integrally with the first side wall via a rounded connection portion and which extends along the inner surface of the second side wall;
the header plate includes a rectangular closure wall having a plurality of tube insertion holes, a pair of first side walls extending from one pair of parallel sides of the closure wall and extending along the outer surfaces of opening-side end portions of the first side walls of the tank body, and a pair of second side walls extending from the other pair of parallel sides of the closure wall and extending along the outer surfaces of opening-side end portions of the second side walls of the tank body;
opposite end portions of the heat exchange tubes are inserted into the tube insertion holes of the header plate and are joined to the header plate;
a first-side-wall-side end portion of each second side wall of the tank body is curved along an outer surface of the corresponding rounded connection portion to thereby form a first bent portion;
a first-side-wall-side end portion of each second side wall of the header plate is curved along the first bent portion of the tank body to thereby form a second bent portion; and
the first side walls of the header plate have respective deformation portions which enter recesses formed between the outer surfaces of the rounded connection portions of the tank body and tip end surfaces of the first bent portions.

2. A heat exchanger according to claim 1, wherein the joining portion is formed at each of opposite end portions of each first side wall of the tank body.

3. A heat exchanger according to claim 1, wherein brazing-material-bleeding prevention portions, each extending between closure-wall-side end portions of the adjacent first and second side walls of the header plate are formed integrally with the closure wall.

4. A heat exchanger according to claim 1, wherein at least one through hole is formed in a portion of each second side wall of the tank body which portion overlaps one of the joining portions; and a nail portion is integrally formed on the corresponding second side wall of the header plate at a location corresponding to the through hole of the tank body, the nail portion projecting towards the top wall of the tank body and having a tip end portion bent and fitted into the corresponding through hole of the tank body.

5. A heat exchanger according to claim 4, wherein a plurality of the through holes are formed in each of the second side walls of the tank body at intervals in the longitudinal direction of the second side walls.

6. A method of manufacturing a heat exchanger comprising:
cutting a first blank for a tank body from a metal material plate, the first blank including a rectangular top-wall forming portion, a pair of first-side-wall forming portions integrally formed at one pair of parallel sides of the top-wall forming portion; a pair of second-side-wall forming portions integrally formed at the other pair of parallel sides of the top-wall forming portion, and joining-portion forming portions integrally formed at opposite end portions of the first-side-wall forming portions;
cutting a second blank for a header plate from a metal material plate, the second blank including a rectangular closure-wall forming portion, a pair of first-side-wall forming portions integrally formed at one pair of parallel sides of the closure-wall forming portion, a pair of second-side-wall forming portions integrally formed at the other pair of parallel sides of the closure-wall forming portion, and forming a plurality of tube insertion holes in the closure-wall forming portion;
bending the joining-portion forming portions of the first blank in relation to the first-side-wall forming portions, bending the first-side-wall forming portions in relation to the top-wall forming portion, bending the second-side-wall forming portions in relation to the top-wall forming portion, and curving opposite end portions of the second-side-wall forming portions along rounded connection portions between the first-side-wall forming portions and the joining-portion forming portions, to thereby form a tank body member including a rectangular top wall, a pair of first side walls extending from one pair of parallel sides of the top wall, a pair of second side walls extending from the other pair of parallel sides of the top wall, joining portions integrally formed on the first side walls via rounded connection portions and extending along inner surfaces of the second side walls, and first bent portions integrally formed on the second side walls;
bending the first-side-wall forming portions and second-side-wall forming portions of the second blank in relation to the closure-wall forming portion, bending opposite end portions of the second-side-wall forming portions into a shape to extend along the first bent portions of the tank body member, and bending opposite end portions of the first-side-wall forming portions into a shape such that these end portions can enter recesses formed between outer surfaces of the rounded connection portions of the tank body member and tip end surfaces of the first bent portions, to thereby form a header plate member including a rectangular closure wall, a pair of first side walls extending from one pair of parallel sides of the closure wall, a pair of second side walls extending from the other pair of parallel sides of the closure wall, second bent portions which are formed at opposite end portions of the second side walls and can extend along the first bent portions of the tank body member, and deformation portions which are formed at opposite end portions of the first side walls and which can enter recesses formed between the outer surfaces of the rounded connection portions of the tank body member and the tip end surfaces of the bent portions;

fitting the header plate member to an opening-side end portion of the tank body member such that the first and second side walls of the header plate member extend along the outer surfaces of the first and second side walls of the tank body member, forcing the second bent portions of the header plate member to extend along the first bent portions of the tank body member, and forcing the deformation portions of the header plate member to enter the recesses of the tank body member, to thereby produce an assembly of the tank body member and the header plate member;

disposing two assemblies, each composed of the tank body member and the header plate member, such that the header plate members of the assemblies face each other;

combining a plurality of heat exchange tubes and fins alternately, and inserting opposite end portions of the heat exchange tubes into the tube insertion holes of the header plate members of the two assemblies; and brazing the joining portions of the tank body members to the second side walls thereof so as to form tank bodies, brazing the first and second side walls of the header plate members to the first and second walls, respectively, of the tank bodies so as to form header plates, brazing the opposite end portions of the heat exchange tubes to the header plates, and brazing the fins to the heat exchange tubes.

7. A method of manufacturing a heat exchanger according to claim 6, wherein brazing-material-bleeding-prevention-portion forming portions are formed integrally with the closure-wall forming portion such that the brazing-material-bleeding-prevention-portion forming portions extend between end portions of the first-side-wall forming portions and second-side-wall forming portions of the second blank, the end portions being located adjacent to the closure-wall forming portion; and when the header plate member is produced, brazing-material bleeding prevention portions extending between closure-wall-side end portions of the adjacent first and second side walls of the header plate member is formed integrally with the closure wall by the brazing-material-bleeding-prevention portion.

8. A method of manufacturing a heat exchanger according to claim 6, wherein at least one through hole is formed in a portion of each second-side-wall forming portion of the first blank, which portion overlaps one of the joining-portion forming portions; an outwardly projecting nail portion is integrally formed on the corresponding second-side wall forming portion of the second blank at a location corresponding to the through hole of the first blank; and when the assembly of the tank body member and the header plate member is produced, the nail portion is bent and fitted into the corresponding through hole.

9. A method of manufacturing a heat exchanger according to claim 8, wherein a plurality of the through holes are formed in portions of each second-side-wall forming portion of the first blank, which portions are to overlap the joining-portion forming portions, at intervals in the longitudinal direction of the second-side-wall forming portion.

* * * * *